G. A. COLLISON.
OVERHEAD WASHER FOR GARAGES AND THE LIKE.
APPLICATION FILED AUG. 13, 1914.
1,167,479.
Patented Jan. 11, 1916.
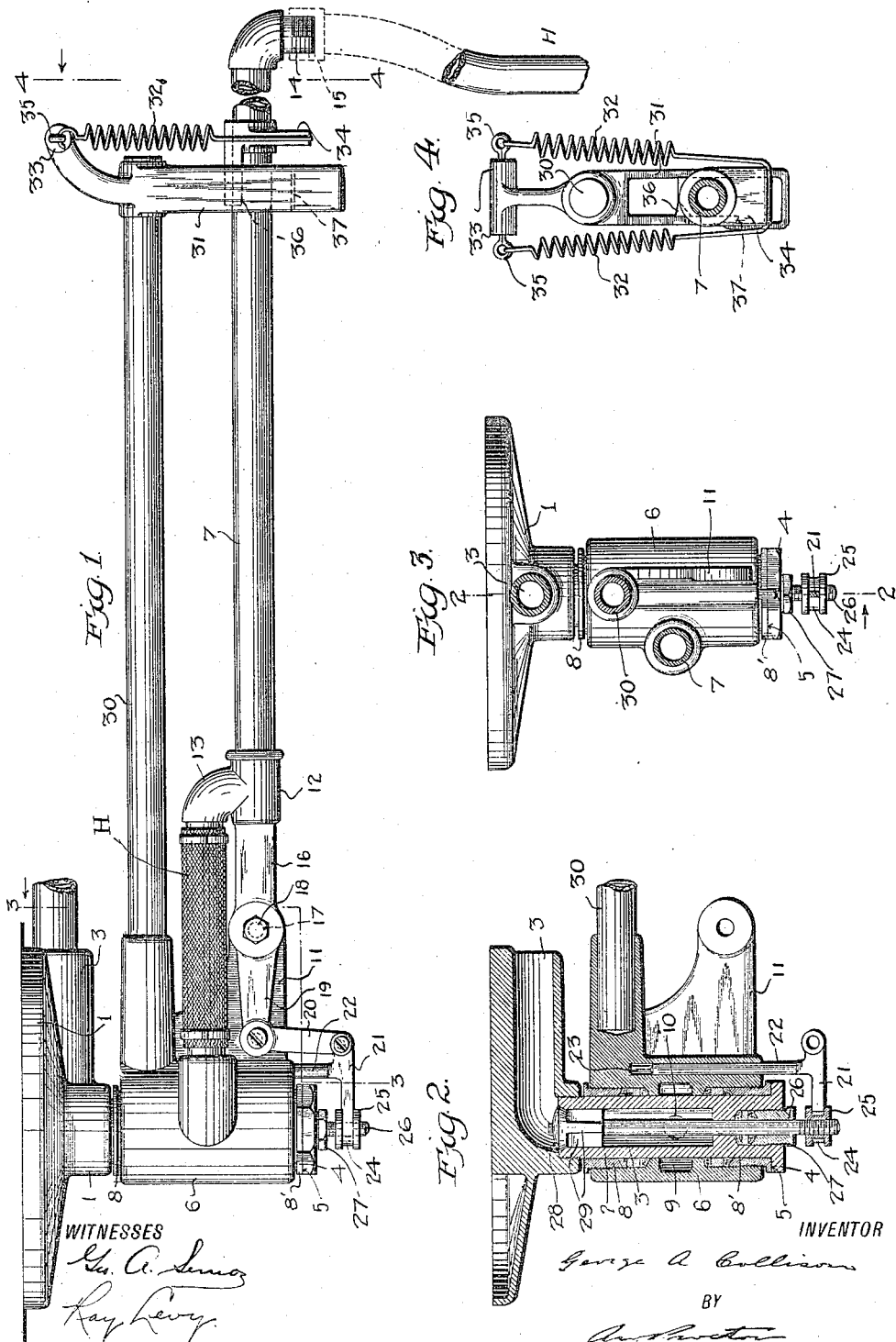

UNITED STATES PATENT OFFICE.

GEORGE A. COLLISON, OF BURLINGTON, VERMONT.

OVERHEAD WASHER FOR GARAGES AND THE LIKE.

1,167,479.  Specification of Letters Patent.  Patented Jan. 11, 1916.

Application filed August 13, 1914. Serial No. 856,702.

*To all whom it may concern:*

Be it known that I, GEORGE A. COLLISON, a citizen of the United States, and resident of Burlington, in the county of Chittenden and State of Vermont, have invented a certain new and useful Overhead Washer for Garages and the like, of which the following is a specification.

This invention relates to a washing appliance for garages, stables, breweries, yards and the like, where a vehicle or object is washed with a stream of water from a hose, the stream being directed on the object from all sides to perform the cleaning. A simple rubber hose of sufficient length to be pulled about on the floor is a very disadvantageous plan, resulting in considerable wear on the hose, and further resulting in considerable inconvenience to the operator who has to keep the hose out of the track of moving vehicles and the like, besides making an inconvenient trip whenever the water is turned on and off. Moreover, the extra length of hose required to reach a distant object or the distant part of an object or vehicle is in the way and likely to interfere with the action when the hose is used on a nearby point. The grease on an ordinary garage floor further makes the hose hard to handle, besides being injurious to the rubber.

The present invention contemplates an overhead washing appliance, made strongly of metal throughout, or substantially so, and adapted to permit the delivery of the water to any required point within a wide area, the apparatus further permitting the quick turning on and off of the water, either temporarily or permanently.

The improved washing apparatus is designed to swivel about a fixed point overhead, having an arm of any required radius, and a depending hose at the extremity of the arm. The mechanical features of the swivel support for the arm, and the cut off of the water, present points of novelty by which the construction is greatly simplified and cheapened and given great durability.

In the drawings:—Figure 1. is a side elevation of a washing appliance embodying the principles of this invention. Fig. 2. is a vertical section on the line 2—2 of Fig. 3. Fig. 3. is a vertical section on the line 3—3 of Fig. 1. Fig. 4 is a detail sectional view on the line 4—4 of Fig. 1.

Constructions embodying the invention will include a base 1 with a downwardly projecting post or column 2, the base 1 being secured to the ceiling or to any overhead support, in any desired way, and having a water passage 3 cored or formed therein to connect with the downwardly projecting post or column 2, the latter being preferably hollow for the whole or a part of its length. The post 2 is preferably tightly threaded into the base 1 so as to connect with the water passage 3 thereof. The post or column 2 has a smooth cylindrical outer surface in the best constructions embodying the invention, terminating in a flange 4 at the bottom which affords a flat thrust surface or shoulder 5. This flange may further constitute a head by which the post or column is secured into the base, being of hexagonal or faced form for this purpose. This post or column 2 supports a sleeve 6 with passages therein, which sleeve constitutes a hub for a radiate arm 7 through which the water to the hose is carried. The sleeve 6 is rotatable on the smooth cylindrical surface of the post or column 2, and is supported against gravity by the thrust surface of the flange 5. In this way it may swivel to any radial position. In addition to affording this swivel movement, the sleeve establishes a permanent water passage from the supply passage 3 in the base to the radial arm 7, from which the water is delivered through a hose pipe H. The best constructions include an annular cavity 9 cored in the interior of the sleeve 6, which always registers with a hole or holes 10 of the post 2, the holes 10 being disposed in the same horizontal plane as the annular cavity 9. A pair of stuffing boxes 8 and 8′ afford permanent water tightness to this swivel connection under all circumstances. These stuffing boxes 8 and 8′ virtually form a fixed part of the sleeve 6 in use and provide the main bearing surfaces on which the sleeve swivels, also taking the endwise thrust thereof due to gravity. The annular cavity 9 may connect with the radial arm 7 in any desired way.

In the best forms of the invention a cut off for the water is provided. This cut off, besides being durable and certain in action, will furthermore be easy to manipulate, and in accordance with the present invention is manipulated by pulling on the hose, which is attached to the extremity of the radial water carrying arm 7. The radial water carrying arm is pivoted to a bracket 11 on the sleeve 6, this bracket being an integral fin or extension from the sleeve. The water carrying arm 7 is a simple piece of pipe secured into a T or elbow casting 12 which has a branch passage 13 with a nipple 14 for a hose connection 15. Except for the branch passage 13 this casting 12 has no other outlet from the pipe 7, but merely has a solid arm extension 16 with a pivot hole or eye 17 adapted to receive a pin or bolt 18 which screws or fits into the bracket 11 and affords a pivot or fulcrum for the radial arm 7. This solid arm 16 is however further extended beyond the pivot 17 by an extension or rock arm 19 with a depending link 20. This link is fastened to a cross head 21 guided to have a vertical up and down movement by a pin guide 22 which slides in a vertical hole 23 of the sleeve 6. This cross head 21 has a fork or eye 24 surrounding a grooved collar 25 on a stem 26 which passes into the hollow post or column 2 through a gland or stuffing box 27. The upward projection of this stem into the post 2 is regulated by the fact that it is screwed into the collar 25 at the lower end. A valve 28 of the ordinary cone or puppet type, having guiding fins 29, seats itself on a suitable seat ground in the central passage of the hollow post or column 2 and is normally closed by the water pressure above, and by the influence of gravity. This valve will however be lifted up from the seat to allow the water to flow when the stem is pushed upward. This occurs under the tilting action of the radial arm 7 which may be drawn down by pulling on its hose connection. A fixed projecting arm 30 of the sleeve 6 affords a separate guide for the movable radial water carrying arm 7 in the best constructions embodying this invention, there being provided a loop 31 on the fixed radial arm 30 in which the water carrying arm 7 is guided. Springs 32 depend from a pair of ears 33 of the loop 31, the springs having an engagement with a saddle 34 fixed to the water carrying arm 7. This saddle is conveniently a simple casting with a groove on the inside adapted to receive a stretched out portion of a single coil spring, the ends of which are hooked into pins or the like 35 of the ears 33. This saddle has the further feature, in the best construction embodying the invention, of a projecting lug 36 extended into the loop 31 and adapted to be caught under a ledge or shoulder 37 thereof when the water carrying arm 7 is pulled down sufficiently, and moved slightly laterally. When caught in this way the water is kept turned on notwithstanding the tension of the springs 32, which normally tend to lift the water carrying arm. Unless this lug is engaged in this way the springs are effective to lift the arm 7 and cut off the water as soon as downward force is released on the depending hose.

In operation the water is carried from the annular cavity 9 of the sleeve 6 to the water carrying arm 7 by the simple short section of flexible hose 15 is attached to the nipple 14 and to a nipple or passage 39 on the sleeve 6, and which permits the up and down movement of the water carrying arm as described. The whole operation of the device is as follows:—It may be imagined that the parts are in the position shown in Figs. 1 and 2, and the valve 28 is closed upon its seat so that the water flow is cut off. If the end of the water carrying arm 7 is pulled down, the movement of the water carrying arm about its fulcrum or pivot 17 will lift the cross head 21 and thereby the stem 26 and valve 28, turning on the water. The water continues to flow as long as the water carrying arm 7 is held down, which may be by reason of a continuous pull thereon or by reason of the engagement of the lug 26 under its ledge 37. The conditions just described are utterly independent of the radial position of the water carrying arm 7, which may extend off in any direction, since the water passage afforded by the annular cavity 9 is equally present in the same way and to the same extent for all radial positions of the water carrying arm.

The supporting arm 30 not only affords a support for the loop 31 which guides the movements of the water carrying arm 7, but also gives greatly increased strength to resist excessive downward pulls, and also aids in turning the sleeve 6 under lateral pulls on the arm 7. The lateral force tending to turn the sleeve 6 is transmitted through the solid arm 30 without putting any binding or breaking strains on the pivot 17, which thereby only has to serve its simple purpose already described, for which its strength is evidently ample.

What is claimed is:—

1. In combination, a hollow post, a valve in the post, means for operating said valve extending outside of the post, a sleeve having a bracket thereon and having a water connection with the post, a water carrying arm pivoted to said bracket, a hose connection between said arm and sleeve, and means for actuating said valve operating means under the movements of said arm.

2. In combination, a hollow post, a valve in the post, means for operating said valve extending outside of the post, a sleeve having a bracket thereon and having a water connection with the post, a water carrying arm pivoted to said bracket, a hose connection between said arm and sleeve, means for actuating said valve operating means under the movements of said arm, and means for holding said arm normally elevated.

3. In combination, a hollow post, a valve in the post, means for operating said valve extending outside of the post, a sleeve having a bracket thereon and having a water connection with the post, a water carrying arm pivoted to said bracket, a hose connection between said arm and sleeve, means for actuating said valve operating means under the movements of said arm, means for holding said arm normally elevated, and means for retaining said arm in either elevated or lowered position.

4. In combination, a hollow post, a valve in the post, a stem for operating said valve extending out through the bottom of the post, a sleeve having a water connection with the post, means guided by the post for lifting said stem, a water carrying arm pivoted to said sleeve and adapted to operate said means, a hose connection between said sleeve and arm, and a supporting arm affording a guide for the water carrying arm.

5. In combination, a hollow post, a valve in the post, a stem for operating said valve extending out through the bottom of the post, a sleeve having a water connection with the post, means guided by the post for lifting said stem, a water carrying arm pivoted to said sleeve and adapted to operate said means, a hose connection between said sleeve and arm, a supporting arm affording a guide for the water carrying arm, said supporting arm having a loop, and a connection for elevating the water carrying arm.

Signed at the city of Burlington in the county of Chittenden and State of Vermont this 16th day of February A. D. 1914.

GEORGE A. COLLISON.

Witnesses:
CLAUDE D. GRATON,
P. A. LE BARGE.

Copies of this patent may be obtained for five cents each, by addressing the "Commissioner of Patents, Washington, D. C."